June 3, 1958 J. ROSEN 2,837,224
AUTOMATIC AUTOMOBILE PARKING AND STACKING DEVICE
Filed Aug. 6, 1956 3 Sheets-Sheet 3

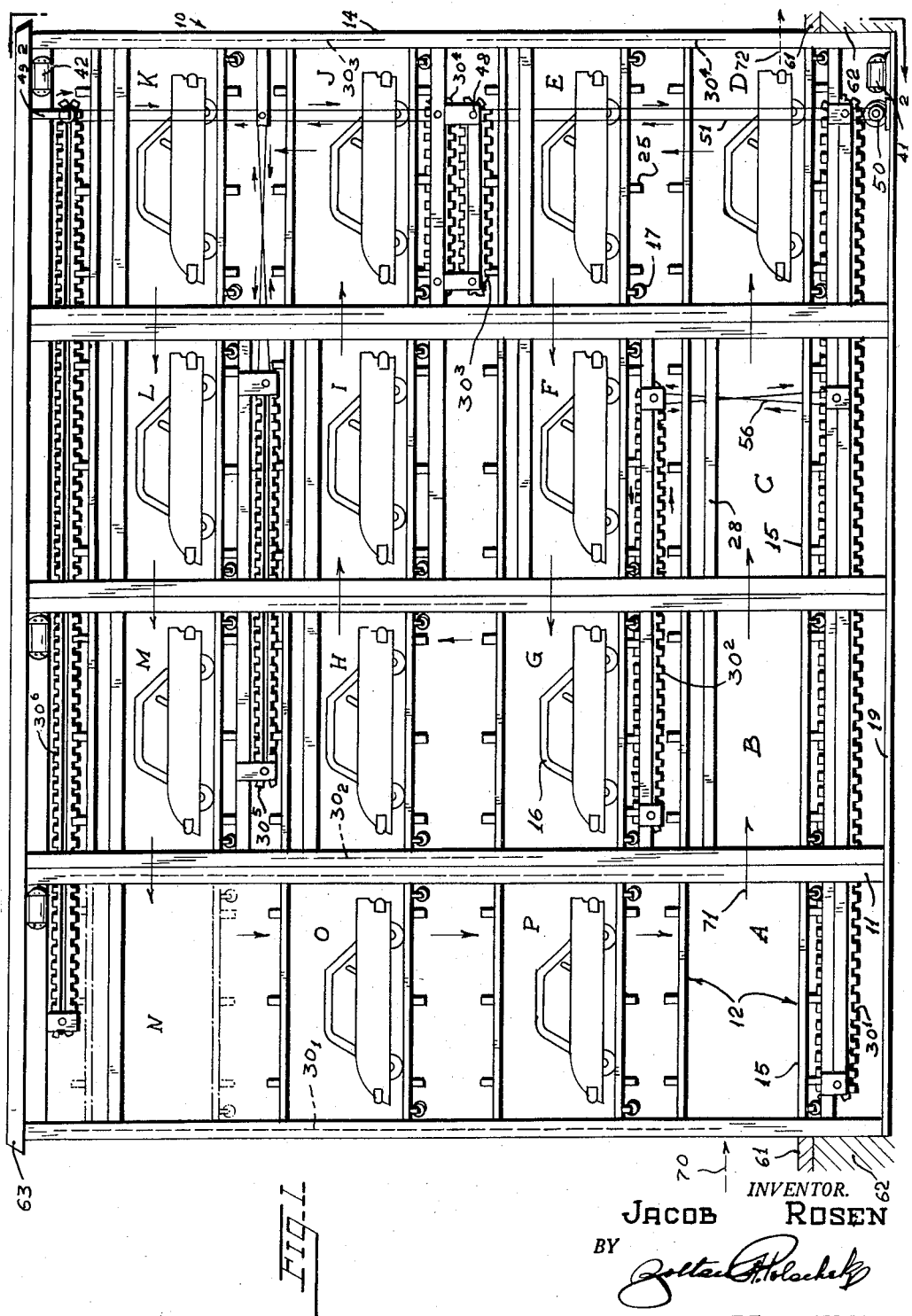

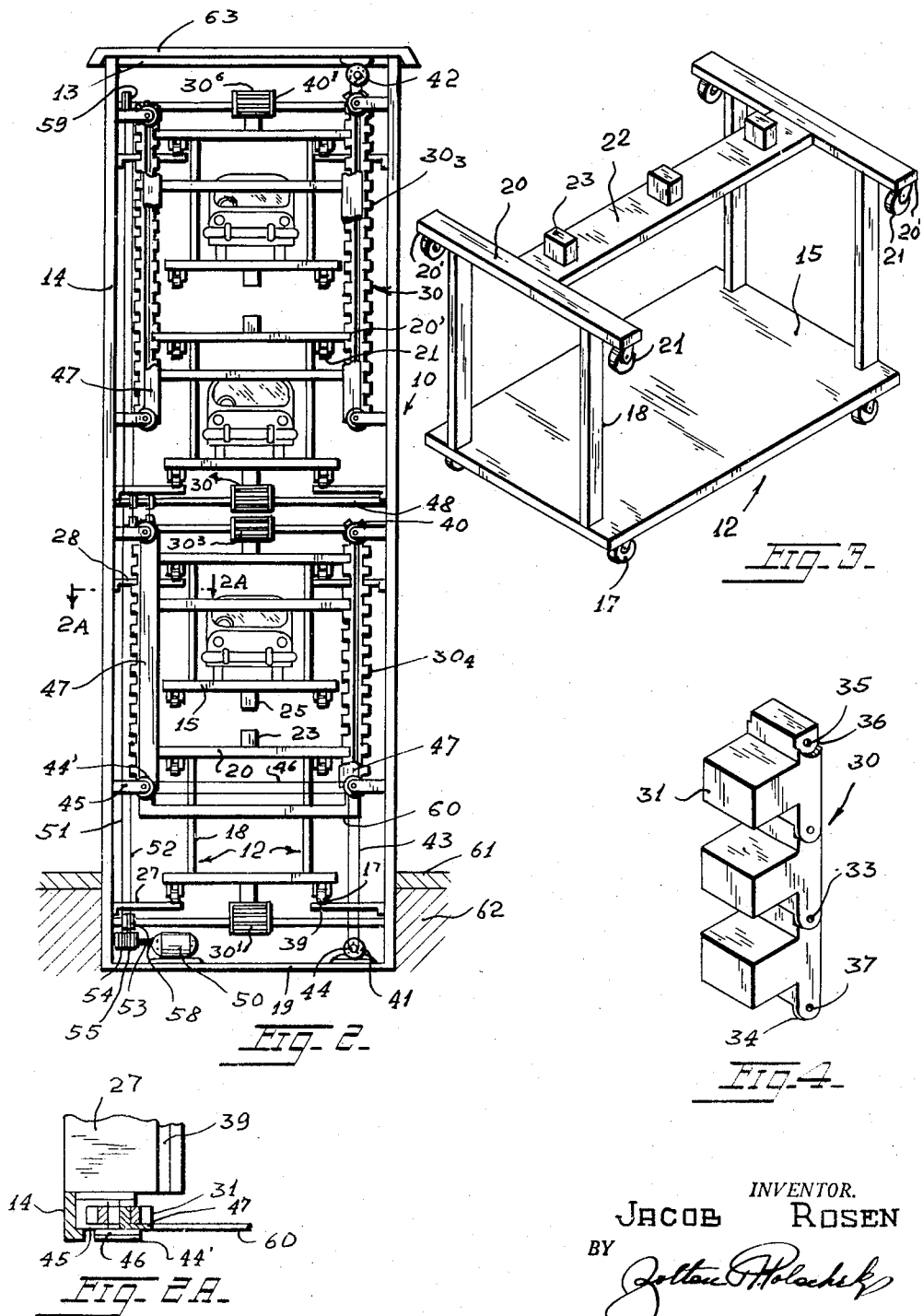

INVENTOR.
JACOB ROSEN
BY
ATTORNEY

United States Patent Office 2,837,224
Patented June 3, 1958

2,837,224

AUTOMATIC AUTOMOBILE PARKING AND STACKING DEVICE

Jacob Rosen, Belmar, N. J.

Application August 6, 1956, Serial No. 602,110

3 Claims. (Cl. 214—16.1)

This invention relates to the art of automatic storing devices and particularly concerns a device for automatically storing and withdrawing from storage vehicles, merchandise, and other bulky articles.

A particular object of the invention is to provide an automatic parking device for automobiles.

A further object is to provide a storage device wherein a maximum proportion of the cubic footage of the device is utilized for storage purposes and conventional elevator shafts and craneways are omitted.

A further object is to provide an automatic parking device wherein bulky items such as vehicles, large crates, and the like may be automatically stored in an endless circulating storage system.

A further object is to provide an automatic storage device employing a circulating system wherein articles such as vehicles to be stored are carried on platforms around the system, the path of movement of the platforms being endless, with portions of the path being horizontal and alternating portions of the path being vertical.

A further object is to provide an automatic storage device provided with vertical elevating means and horizontal transporting means in an endlessly circulating system.

A further object is to provide a modular construction for an automatic storage system including an endless circulating system for stored articles.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an automatic storage device embodying the invention.

Fig. 2 is a rear elevational view of the device.

Fig. 2A is a fragmentary sectional view taken on lines 2A—2A of Fig. 2.

Fig. 3 is a perspective view of a trolley or truck employed in the device.

Fig. 4 is a fragmentary perspective view of a portion of a sprocket chain used in the device.

Figure 5:
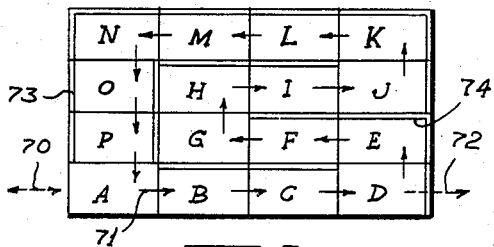
Fig. 5 is a diagram useful in explaining the endless path of movement of stored articles through the device.

Heretofore automatic storage devices and particularly automatic automobile parking devices, in order to be practical in operation, have required stacking of many vehicles in a multi-storied structure by use of elevators, cranes, ramps, and the like. The provision of necessary elevator shafts, craneways, ramp approaches, aisles, etc., has been accompanied by two major disadvantages. Firstly, there has been the very costly machinery required to elevate large objects as automobiles quickly and safely. Secondly, there has been the relatively large amount of space occupied by these horizontal, vertical and inclined passageways. In conventional installations of automatic storage devices including those of the most efficient types, the amount of space both in floor area and cubic footage devoted to such passageways which are unavailable for actual storage purposes may range from 20% to 60% of the entire installation. This excessive utilization of space for non-revenue producing purposes has been one of the most important deterrents to use of automatic parking systems and devices in congested areas such as the downtown or business areas of almost all cities.

In the present invention substantially all the available cubic footage of free space in the device is used both for storage spaces and for passageways enabling stored article movement. The device is so constructed that an area as small as ten feet wide, such as an alleyway, may be used for installation of a unit embodying the invention. By use of such a unit an area normally used for storing a maximum of three or four automobiles may be adapted to store twelve, sixteen, or even more large-size automobiles.

The invention is equally adaptable for warehousing of large crates, and bulky articles of various types in an economical and efficient fashion. By means of the present invention a single attendant is sufficient to maintain and operate a parking or storing facility where a conventional parking or storing installation of equal storage capacity would require three or more attendants.

Details of a preferred embodiment of the invention will now be described with reference to the drawings. In Figs. 1 and 2 is shown a generally rectangular open frame 10 formed of steel girders which may be I-beams, channels, angle beams, flat strip plates, etc., riveted, bolted or welded together. Vertical beams 14 at the corners of the device and vertical beams 11 spaced at equal intervals therebetween define vertical sections which are each subdivided into compartments lettered alphabetically A through P. The beams are joined to a base plate 19 at the bottom and crossbars 13 at the top.

In the device as shown in Figs. 1 and 2, sixteen compartments are thus provided. A greater or lesser number of compartments may be provided for in different installations, as will be explained. The device is provided with a plurality of movable trucks 12 which have platforms 15 for supporting the automobiles 16 or any other articles to be stored in the device.

The structure of the truck 12 is best shown in Fig. 3. The rectangular platform 15 supports casters or rollers 17 near each corner thereof. On the platform are disposed the vertical posts 18 near each corner. A horizontal crossbar 20 is attached to the upper end of each pair of posts 18. The crossbars overhang the posts sufficiently to provide space for supporting the casters or rollers 21 with a portion 20' at each end of each crossbar extending beyond roller 21. The crossbars are joined by a central longitudinally disposed tie-bar 22. On the tie-bar are mounted upwardly extending spaced lugs 23. At least two such lugs should be provided, one being near each end of the tie-bar but three such lugs may be used as shown. Similar depending lugs 25 are disposed in spaced array on the underside of the platform.

The device is provided with a plurality of these trucks 12 equal to the number of compartments less one so that one compartment is always clear of both a truck and of a stored article. The unoccupied compartment is no one particular space but may be any one of the available storage spaces at any one time and continually changes as the device operates. Certain compartments are provided with horizontal angle beams or rails 27 upon which the rollers 17 ride. Some of these compartments, as well as other compartments, have horizontal angle beams or rails 28 on which ride the rollers 21. Beams 27 and 28 are disposed on opposed sides of the compartments and are supported on the vertical beams 11 and 14. The beams 27, 28 extend distances equal to those between adjacent beams 11 and 14 so that clear vertically extending channels, as shown in Fig. 2A, are provided at the vertical beams at the ends of the compartments. In certain of these spaces are vertically disposed endless sprocket chains 30 of greater or less length depending on the distances the trucks are to be elevated or lowered.

The sprocket chains may be formed of sections as shown in Fig. 4. Each section has a protruding tooth 31 for engaging and end 20' of a crossbar 20. The several sections 32 are joined to each other by pintles 33 which extend through apertures 37 in the depending fingers 34 of each section and through the apertures 35 of the recessed side walls 36 of each adjoining section. The sprocket chains are carried on and around sprocket wheels or pulleys 40 driven by a motor 41 or a plurality of motors 42 at the bottom and top of the device, respectively, via endless belts 43, 46 and suitable pulleys 44, 44' as shown in Fig. 2. Brackets 45 support the sprocket wheels 40 and pulley 44'. These brackets are attached to the vertical beams 11 and 14. Endless belts 46 extend horizontally between the sprocket wheels to drive the sprocket chains at opposite sides of the frame structure.

In order to simplify the drawings the vertical extent of the several sprocket chains 30 in the various compartments are indicated in Fig. 1 by dotted lines $30_1$, $30_2$, $30_3$ and $30_4$. Similar horizontally disposed sprocket chains are provided to move the trucks 12 horizontally through the various compartments. These endless chains have lengths depending on the distances they are required to move the trucks. These chains are respectively designated $30^1$, $30^2$, $30^3$, $30^4$, $30^5$ and $30^6$ in Figs. 1 and 2. The chains are carried on sprocket wheels 40' mounted on shafts 48. The shafts 48 are journalled in brackets 49 shown in Fig. 1.

Motor 50 drives the several chains $30^{1-6}$ via endless belts or cables 51, 52, 53, 54 carried by pulleys 57 on shaft 58 of motor 50 and pulleys 59 on the various shafts 48. Certain crossed belts 55, 56 are provided together with appropriate pulleys to transfer driving energy from the motor 50 to the various horizontally disposed endless belts. The pulleys 59 may be frictionally mounted or may be provided with conventional friction clutches so that the endless belts will slip when any one or more of the horizontal sprocket chains $30^{1-6}$ must remain stationary because the trucks in engagement with the sprocket chains are being restrained from movement. Horizontally disposed bars 60 attached to guide rails 47 may be employed to bar longitudinal movements of the trucks at the ends of the several passageways. Lugs 23 are disposed so that they engage the downwardly extending teeth of sprocket chains $30^3$, $30^5$ and $30^6$ at their lower courses. Lugs 25 are disposed to engage sprocket chains $30^1$, $30^2$, $30^4$ at their upper courses. Grooves 39 may be provided in the laterally extending angle plates 27 and 28 to keep the rollers 17 and 21 moving in guided straight paths. Suitable guide tracks or rails 47 may be provided for the vertically extending sprocket chains 30 to prevent flexing while elevating and lowering trucks and while trucks are being loaded on and off the sprocket chains. The guide tracks may be attached to brackets 45. The guide tracks are omitted in part from Fig. 2 to show the sprocket chains 30 more clearly.

The several motors may be started by manually operated or automatically operated conventional switches. The electrical apparatus required for energizing the motors and starting and stopping them are well known in the art and need not be described here.

The frame structure is preferably located so that the lowermost platforms 15 are coplanar with the surface of pavement 61. The motors 44 and 50 will thus be located in an excavated basement space in the ground 62. A roof 63 may be provided over the frame structure.

Horizontal movement of the trucks 12 is accomplished by the engagement of one or more of lugs 23 or 25 with teeth of the horizontally disposed sprocket chains $30^1$ through $30^6$. Vertical movement of the trucks is accomplished by engagement of the ends 20' of the crossbars 20 with the parallel vertically disposed chains $30_1$ through $30_4$. When a truck is lowered or raised vertically its travel is stopped by engagement of the lugs 23 or 25 with a horizontal sprocket chain. Slippage of the belts 43, 46 on their pulleys or other friction clutch means permit the vertical sprocket chains to stop while the motor 41 and 42 may continue rotating. The horizontal sprocket chain engaged by the lugs 23 or 25 of the truck can now pull or push the truck off the vertical sprocket chains on to the horizontal rails provided by angle members 27, 28. The truck will now move horizontally in one direction or another until its movement is stopped by the rear portions on rails 47 and the bars 60 or by the stoppage of movement of the sprocket chain itself as follows.

If two trucks are being moved horizontally simultaneously, the first truck in the path of movement will be stopped by bars 60 which will likewise stop the movement of the driving sprocket chain and consequently the following truck will also stop. The bars 60 should be so disposed that they will stop the movement of the leading truck only when the outwardly extending ends 20' of the crossbars 20 of that truck are engaged properly in the teeth of the vertical chain sprockets located at the end of each horizontal passageway. The switching system of the device may be arranged as in a conventional automatic elevator to stop the vertical sprocket chain movement when the top or bottom limit of vertical travel of the truck has been accomplished. The operator of the device will operate the motors 41, 42 to elevate or lower the trucks only when the trucks are fully and properly engaged by the vertically disposed sprocket chains. Of course automatic switching and signal means may be provided to perform this control function.

Reference will now be made to Figs. 1 and 5 to describe the truck routing system of the device. The device will in general have one less truck than the number of compartments. In Figs. 1 and 5 there are thus shown sixteen compartments and fifteen trucks with compartment N shown vacant in Fig. 1.

To load the device an automobile may enter compartment A at the front end of the frame structure as indicated by dotted arrow 70. The automobile may be driven over the several platforms directly onto the platform in compartment D. Let it be assumed that initially the device contains no stored vehicles so that the first automobile is stopped in compartment D. Three additional vehicles may then be driven in succession into compartments C, B and A, respectively. In order to load the next automobile, compartment A must be cleared. To do this the trucks in compartments K, L, M are moved horizontally to the left the length of one compartment. This fills the section N, O, P, A and compartment K is vacated. The truck in compartment J is then lifted to compartment K; the trucks in compartments H and I move horizontally to the right to clear compartment H; the truck in compartment G is lifted to compartment H; the trucks in compartments E and F move to the left, clearing compartment E; the truck in compartment D is lifted into compartment E; the trucks in compartments A, B, C move to the right to clear compartment A and the trucks in compartments N, O, P move down to clear compartment N and provide a truck with vacant platform in compartment A.

The endless path of travel of the trucks is readily traced by means of arrows 71 in Figs. 1 and 5. It will be noted that eight movements horizontally and vertically are required of all the trucks for compartment A to be cleared. The speed of movement of the horizontal and vertical driving means may be set so that three or four seconds are required for each movement in any vertical or horizontal direction. Thus compartment A is available for loading another automobile approximately every thirty seconds. In a total time of less than ten minutes the entire fifteen trucks can be loaded. Similarly in less than ten minutes the entire fifteen trucks can be circulated through compartment A to clear the entire device of stored automobiles. If desired compartment D can be used as an exit from the device as indicated by dotted arrow 72 to speed unloading. Also the motors 41 and 42 can be run in reverse so that when it is desired to unload any particular truck it will not be necessary to circulate more than one half of the trucks through compartments A or D. By appropriate selection of forward or reverse movements, it will thus be possible to unload even the most remote truck (in compartment K) from compartments A or D in a maximum of about three minutes. The short vertical lines 73 and horizontal lines 74 in Fig. 5 represent the limits of the horizontal passageways in which the trucks travel.

Figure 6:
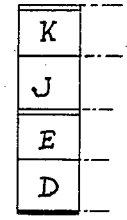
Figs. 6 and 7 are diagrams showing the arrangement of compartments in the device.
Figure 7:
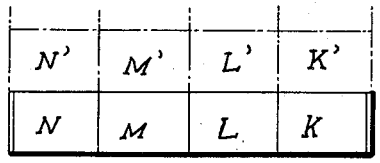

In Figs. 6 and 7 end and top views of the device are represented diagrammatically. The arrangement of compartments A–P is a narrow cellular unit with a single compartment for each cell. The entire assembly is a single self-contained independent structure which may be disposed in an area as limited as ten feet by eighty feet. If the available area is only ten feet by sixty feet, a twelve cell arrangement may be used, allowing twenty feet in length and ten feet in width for each compartment. Where wider areas are available, an economy in construction can be effected. Thus if the available space is twenty feet wide, two compartment assemblies may be constructed side by side with common central beams 11, 14. The dotted lines in Figs. 6 and 7 indicate this plural modular arrangement with only upper compartments K', L', M', N' indicated juxtaposed to compartment K, L, M, N.

Figure 8:
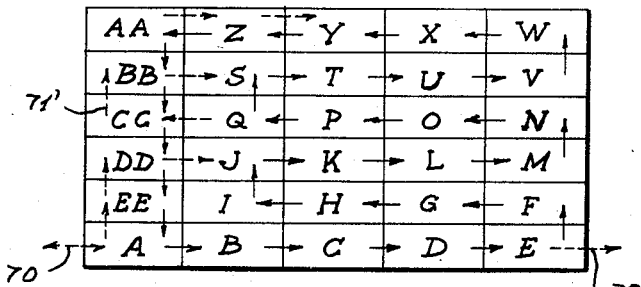
Fig. 8 is a diagram showing another arrangement of compartments according to the invention.
Figure 10:
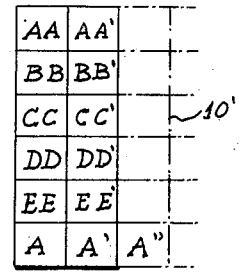
Figs. 9 and 10 are top and end views, respectively, of the arrangement of Fig. 8.
Figure 9:
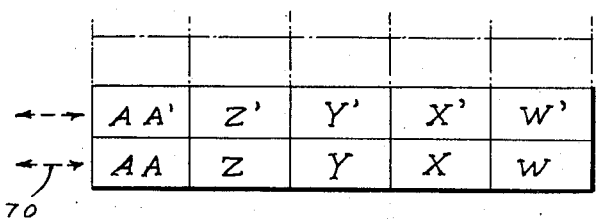

Fig. 8 shows a thirty compartment arrangement with compartments A–Z, AA–EE. Figs. 9 and 10 show a plural arrangement of the multi-cellular structure of Fig. 8. Fig. 9 is a top plan view and Fig. 10 is an end view. The top line of compartments of one assembly are designated W–Z, AA and the adjacent assembly has corresponding compartments W', X', Y', Z', and AA'. Similarly the end compartments of one assembly are AA, BB, CC, DD, EE and A while the adjacent compartments in the other assembly are AA', BB', CC', DD', EE' and A'. Additional frame structures may be further laterally attached as indicated by the dotted lines 10' in Figs. 9 and 10 to multiply the capacity of the storage device installation. In each of these multiple unit installations, end compartments A, A', A", etc., on the pavement level will serve as the entrance compartment. It may also serve as the exit compartment.

Installations where more than sixteen compartments are provided are particularly well adapted for warehousing operations where crates or other containers of identical merchandise are stored in the several compartments. In such uses of the device, no great urgency will generally exist to load or unload the entire stored contents of the system in a few minutes as may occur in an active automobile parking system. The longer periods of time thus allowed for loading and unloading operations permits maximum possible utilization of storage space with a minimum amount of space devoted to idle purposes. In a warehouse unit of the type shown in Fig. 8 only a single compartment need be clear of a truck at any one time while the system circulates step by step as described above. This efficient use of available space is in marked contrast with conventional warehousing practices where large areas and aisles must be left open and clear for movement of cranes, dollies, lift trucks, elevators, conveyors, etc.

The mechanism described herein for moving the trucks horizontally is offered as one relatively simple way of accomplishing this purpose. Other known horizontal conveyors means which may be used are described in Patents 2,714,456 and 2,626,065. Other known types of elevators may be used for lifting and lowering trucks 12.

The device described provides a number of very important advantages over conventional parking lots and parking garages. The device is so arranged that a car driver can drive his own car into and out of the device. Since the cars can be driven up on to a truck in the device, parked and locked, the car remains in a much safer condition during parking. No handling or driving of the parked cars occurs during storage in the device. The labor required to operate a parking installation is reduced to about one-third the usual requirement because all that is needed is an operator to start and stop the motors. The device is a skeleton-like structure which can be constructed at a cost far less than any known type of parking garage. The device can be disassembled if necessary and moved to another location; and can be reassembled and put in service in a few days. The modular structure is a particularly valuable feature because a parking lot owner can start with one unit and then add additional units as increasing business requires. Other important economies in utilization of space, tax savings, etc., may be obtained by means of this device.

It is possible to employ the endless path routing system for a horizontally arranged compartmented structure. For example, Fig. 5 and Fig. 8 may represent layouts of parking fields or lots with arrows 71 representing only movements in a horizontal plane of trucks or dollies drawn in the endless paths. Conveyor means such as endless belts 30 may be used to move the trucks in the defined passageways. It is possible to install this horizontal arrangement in a basement parking garage of an office building or an apartment house. This arrangement will eliminate the necessity of providing ramps, aisles and turning spaces and may triple the storage capacity of an ordinary one floor parking facility. Other advantages of economy in operation and installation apply to the horizontally arranged endless path storage system. The horizontal arrangement may be extended or applied to single warehouse floor with corresponding gains in efficiency and economy in storage operations. As one example, the device makes use of electric or hydraulic fork lift trucks on the storage floor unnecessary.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A storage device, comprising a frame structure, said structure being divided into a plurality of compartments, said compartments containing a plurality of trucks having platforms for receiving articles to be stored, means for elevating said trucks through the compartments, and means for moving the trucks laterally through the compartments, whereby said trucks may each be caused to travel an endless path through the compartments, said path having alternating vertical and horizontal portions, each of said platforms having a plurality of casters disposed at corners thereof, a plurality of lugs depending from the platform, a plurality of posts disposed near corners of the platform, crossbars connecting opposite pairs of said posts, other casters depending from ends of said crossbars with said ends having portions extending beyond said other casters, a tie-bar connecting said crossbars, and lugs extending upwardly from said tie-bar.

2. A storage device, comprising an open rectangular frame structure, said structure being divided into a plurality of compartments, said compartments containing a plurality of trucks having platforms for receiving articles to be stored, each of said platforms having a plurality of casters disposed at corners thereof, a plurality of lugs depending from the platform, a plurality of posts disposed near corners of the platform, crossbars connecting opposite pairs of said posts, other casters depending from ends of said crossbars with said ends having portions extending beyond said other casters, a tie-bar connecting said crossbars, and lugs extending upwardly from said tie-bar; endless chain means for engaging said portions and elevating said trucks through the compartments, and endless chain means for engaging said lugs and moving the trucks laterally through the compartments, whereby said trucks may each be caused to travel an endless path through the compartments, said path having alternating vertical and horizontal portions.

3. A storage device for a plurality of automobiles, crates, and the like, comprising a frame structure, said structure containing a plurality of compartments, said compartments containing a plurality of trucks less in number than the number of compartments, each of said trucks having a platform for receiving an article to be stored thereon, each of said platforms having a plurality of casters disposed at corners thereof, a plurality of lugs depending from the platform, a plurality of posts disposed near corners of the platform, crossbars connecting opposite pairs of said posts, other casters depending from ends of said crossbars with said ends having portions extending beyond said other casters, a tie-bar connecting said crossbars, and lugs extending upwardly from said tie-bar; endless sprocket chain means for lifting and lower said trucks through certain of the compartments in predetermined vertical passageways, endless sprocket chain means for transporting said trucks laterally through others of the compartments in predetermined horizontal passageways, and a plurality of motors operatively connected to each of said means for driving movement thereof, said vertical and horizontal passageways constituting an endless path within the frame structure.

References Cited in the file of this patent

UNITED STATES PATENTS

| | | |
|---|---|---|
| 1,123,934 | Schrafft et al. | Jan. 5, 1915 |
| 1,458,881 | Gromer | June 12, 1923 |
| 1,577,589 | Rapp | Mar. 23, 1926 |
| 1,775,799 | Young | Sept. 16, 1930 |
| 1,852,633 | Ziebarth | Apr. 5, 1932 |
| 1,882,656 | Creedon | Oct. 18, 1932 |
| 1,924,130 | Morton | Aug. 29, 1933 |
| 1,972,258 | Boyle | Sept. 4, 1934 |
| 2,569,393 | Walker | Sept. 25, 1951 |
| 2,711,616 | Weller et al. | June 28, 1955 |